US012667893B2

(12) United States Patent
Kuraya

(10) Patent No.: US 12,667,893 B2
(45) Date of Patent: Jun. 30, 2026

(54) CHAMFERING TOOL AND ROTARY TOOL

(71) Applicant: YUKI SANGYO Co., Ltd., Okazaki (JP)

(72) Inventor: Hisanobu Kuraya, Okazaki (JP)

(73) Assignee: YUKI SANGYO Co., Ltd., Okazaki (JP)

( * ) Notice: Subject to any disclaimer, the term of this patent is extended or adjusted under 35 U.S.C. 154(b) by 645 days.

(21) Appl. No.: 18/081,684

(22) Filed: Dec. 15, 2022

(65) Prior Publication Data

US 2023/0373017 A1      Nov. 23, 2023

(30) Foreign Application Priority Data

May 20, 2022    (JP) .................................. 2022-083449

(51) Int. Cl.
*B23B 31/08* (2006.01)
*B23B 51/10* (2006.01)

(52) U.S. Cl.
CPC .............. *B23B 31/08* (2013.01); *B23B 51/10* (2013.01)

(58) Field of Classification Search
CPC ................................. B23B 31/08; B23B 51/10
See application file for complete search history.

(56) References Cited

U.S. PATENT DOCUMENTS

| | | | | | |
|---|---|---|---|---|---|
| 2,383,854 | A | * | 8/1945 | Gwinn, Jr. ............ | B23B 51/104 |
| | | | | | 408/112 |
| 2,475,385 | A | * | 7/1949 | Frisco ..................... | B23B 31/08 |
| | | | | | 279/16 |
| 2,591,273 | A | * | 4/1952 | Emig ....................... | B23B 31/08 |
| | | | | | 408/709 |
| 2,722,812 | A | * | 11/1955 | Golasky .................. | B23B 31/08 |
| | | | | | 408/127 |
| 3,087,360 | A | * | 4/1963 | Garberding ............ | B23D 77/00 |
| | | | | | 407/47 |
| 5,993,296 | A | * | 11/1999 | Rogers .................... | B23B 31/08 |
| | | | | | 451/49 |
| 7,717,653 | B2 | * | 5/2010 | Miyata ............... | B23Q 11/0032 |
| | | | | | 408/127 |
| 2019/0084056 | A1 | | 3/2019 | Sweet et al. | |

FOREIGN PATENT DOCUMENTS

| | | | | | |
|---|---|---|---|---|---|
| DE | 60206518 | T2 | * | 7/2006 | ........... B24B 33/105 |
| JP | S56-137912 | U | | 10/1981 | |
| JP | 2003-117787 | A | | 4/2003 | |
| JP | 2007-160480 | A | | 6/2007 | |
| JP | 2022-74292 | A | | 5/2022 | |
| JP | 2022-74543 | A | | 5/2022 | |
| JP | 7090370 | B1 | * | 6/2022 | ............. B23B 31/08 |

* cited by examiner

*Primary Examiner* — Eric A. Gates

(74) *Attorney, Agent, or Firm* — Yokoi & Co., U.S.A.; Toshiyuki Yokoi

(57) ABSTRACT

A chamfering tool includes: a movable flange having a cylindrical shape so that one end portion of a joint member is inserted in the movable flange; a second spring member configured to energize the movable flange by one end portion of the second spring member; a spring receiver to which the other end portion of the second spring member abuts; a fixed flange fixed to the other end portion of the joint member; and a chamfering member fixed to the other end portion of the joint member, wherein the fixed flange and the movable flange have abutting surfaces formed by a flat surface, and an axial center of the chamfering member substantially coincides with an axial center of the shaft member when the abutting surfaces abut on each other.

7 Claims, 6 Drawing Sheets

10

CHAMFERING TOOL AND ROTARY TOOL

CROSS-REFERENCES TO RELATED APPLICATIONS

This patent specification is based on Japanese patent application, No. 2022-83449 filed on May 20, 2022 in the Japan Patent Office, the entire contents of which are incorporated by reference herein.

BACKGROUND OF THE INVENTION

1. Field of the Invention

The present invention relates to a chamfering tool for chamfering an edge of a hole formed on a surface of a workpiece and a rotary tool for machining a predetermined portion of a workpiece.

2. Description of Related Art

Conventionally, a chamfering tool is known for chamfering an edge of a hole formed on a surface of a workpiece so that a chamfered width is uniformized in a circumferential direction (Patent Document 1).

The chamfering tool described in Patent Document 1 is the chamfering tool for chamfering an edge of a tilting hole formed in a direction inclined with respect to the normal line of the surface of the workpiece, wherein a cutter blade is pivotably and rockably supported on an end portion of a holder rotated around an axial line via a pin arranged orthogonal to the axial line and a pair of chamfering blades crossing to each other at a predetermined angle is formed on the cutter blade.

[Patent Document 1] Japanese Unexamined Patent Application Publication No. 2007-160480

BRIEF SUMMARY OF THE INVENTION

However, in the chamfering tool described in the above described Patent Document 1, an operation of aligning the axial line of the holder with the center of the tilting hole is required. In addition, when the chamfering tool is used by mounting the chamfering tool on a machining tool, there is a problem that the chamfered width becomes uneven if the axial line of the holder is misaligned from the center of the tilting hole due to variations in the position of the tilting hole formed on the surface of the workpiece.

The present invention provides a chamfering tool and a rotary tool capable of performing a chamfering with a uniformed chamfering width without requiring accurate alignment operation even if there are variations in the position of the tilting hole formed on the surface of the workpiece.

The invention of a chamfering tool of one aspect of the present invention includes: a sleeve having a cylindrical shape, the sleeve being configured to receive a rotation power and rotate around a center axis; a shaft member configured to rotate interlockingly with the sleeve, one end portion of the shaft member being inserted in the sleeve, the shaft member being movable in an axial direction; a first spring member inserted in the sleeve so as to energize the one end portion of the shaft member; a joint member composed of a universal joint, one end portion of the joint member being connected with the other end portion of the shaft member so that the joint member rotates interlockingly with the shaft member; a movable flange having a cylindrical shape, the one end portion of the joint member being inserted in the movable flange; a second spring member, one end portion of the second spring member being configured to energize the movable flange; a spring receiver, the other end portion of the second spring member being configured to abut on the spring receiver; a fixed flange fixed to the other end portion of the joint member; and a chamfering member fixed to the other end portion of the joint member, wherein the fixed flange has a first abutting surface formed by a flat surface and the movable flange has a second abutting surface formed by a flat surface, and an axial center of the chamfering member substantially coincides with an axial center of the shaft member when the first abutting surface and the second abutting surface abut on each other.

In the chamfering tool of one aspect of the present invention, the chamfering member is fixed to the other end of the joint member composed of the universal joint. When the chamfering member is inserted in the hole of the workpiece and the chamfering member abuts on the edge of the hole, the chamfering tool moves so that the axial center of the chamfering member is aligned with the center of the hole. Thus, even if the position where the hole of the workpiece is formed is uneven, the chamfering can be performed so that the chamfering width becomes even.

The invention of another aspect of the present invention is an invention of a rotary tool which includes: a sleeve having a cylindrical shape, the sleeve being configured to receive a rotation power and rotate around a center axis; a shaft member configured to rotate interlockingly with the sleeve, one end portion of the shaft member eing inserted in the sleeve, the shaft member being movable in an axial direction; a first spring member inserted in the sleeve so as to energize the one end portion of the shaft member; a joint member composed of a universal joint, one end portion of the joint member being connected with the other end portion of the shaft member so that the joint member rotates interlockingly with the shaft member; a movable flange having a cylindrical shape, the one end portion of the joint member being inserted in the movable flange; a second spring member, one end portion of the second spring member being configured to energize the movable flange; a spring receiver, the other end portion of the second spring member being configured to abut on the spring receiver; a fixed flange fixed to the other end portion of the joint member; and a workpiece machining tool fixed to the other end portion of the joint member, wherein the fixed flange has a first abutting surface formed by a flat surface and the movable flange has a second abutting surface formed by a flat surface, and an axial center of the workpiece machining tool substantially coincides with an axial center of the shaft member when the first abutting surface and the second abutting surface abut on each other. Because of this, the machining can be performed precisely and uniformly in the machining of the workpiece.

The invention of another aspect o the present invention is a rotary tool configured to be attached to a machine having a robot arm or an NC controller, the rotary tool includes: a shaft member configured to rotate, the shaft member being movable in an axial direction; a joint member composed of a universal joint, one end portion of the joint member being connected with the other end portion of the shaft member so that the joint member rotates interlockingly with the shaft member; a movable flange having a cylindrical shape, the one end portion of the joint member being inserted in the movable flange; a spring member, one end portion of the spring member being configured to energize the movable flange; a spring receiver, the other end portion of the spring member being configured to abut on the spring receiver; a fixed flange fixed to the other end portion of the joint member; and a workpiece machining tool fixed to the other end portion of the joint member, wherein the fixed flange has a first abutting surface formed by a flat surface and the movable flange has a second abutting surface formed by a flat surface, and an axial center of the workpiece machining tool substantially coincides with an axial center of the shaft member when the first abutting surface and the second abutting surface abut on each other. Because of this, since the rotary tool can be attached to the machine having the robot arm or the NC controller, the machining can be performed more precisely and the machining can be automated.

The invention of another aspect of the present invention is characterized in that the fixed flange is arranged so that a movable portion of the universal joint does not interfere with the movable flange in the chamfering tool or the rotary tool described above. Because of this, the movable flange is prevented from interfering with the universal joint. Thus, the operation of the universal joint is not restricted.

The invention of another aspect of the present invention is characterized in that a movable center point of the universal joint is included in a surface including the first abutting surface and the second abutting surface when the first abutting surface and the second abutting surface abut on each other in the chamfering tool or the rotary tool described above. If the movable center point of the universal joint is not included in the surface including the first abutting surface and the second abutting surface, it is necessary to enlarge the clearance between the abutting surface of the fixed flange and the universal joint or the clearance between the abutting surface of the movable flange and the universal joint. Thus, it is necessary to lengthen the length of the universal joint and the entire size becomes necessarily large. Accordingly, the size of the chamfering tool or the rotary tool can be reduced by this invention.

The invention of another aspect of the present invention is characterized in that the other end portion of the shaft member and the one end portion of the joint member are screwed to each other in the chamfering tool or the rotary tool described above. Because of this, the shaft member and the joint member are internally connected with each other. Thus, the size of the chamfering tool or the rotary tool can be reduced.

The invention of another aspect of the present invention is characterized in that the first spring member and the second spring member are composed of a compression coil spring, and a second force applied to the second spring member is smaller than a first force applied to the first spring member in the chamfering tool or the rotary tool described above. Because of this, the chamfering width or the machining width can be uniformed more evenly.

The invention of another aspect of the present invention is characterized in that the shaft member is axially supported by a ball spline bearing so that the shaft member is movable in the axial direction with respect to the sleeve in the chamfering tool or the rotary tool described above. Because of this, the shaft member can be slid smoothly in the longitudinal direction by the rolling of balls and the rotating force can be transferred easily.

The invention of another aspect of the present invention is characterized in that the sleeve is configured to rotate while being connected with a rotating shaft of an air motor or an electric motor in the chamfering tool or the rotary tool described above. Because of this, the chamfering tool or the rotary tool can be rotationally driven easily.

In the invention of the chamfering tool or the rotary tool described above, even if the position where the hole of the workpiece is formed is uneven, the chamfering can be performed so that the chamfering width becomes even. In the invention described above, the movable flange is prevented from interfering with the universal joint. Thus, the operation of the universal joint is not restricted. In the invention described above, the size of the chamfering tool or the rotary tool can be reduced.

In the invention of another aspect of the present invention, the chamfering width or the machining width can be uniformed more evenly. In the invention described above, the shaft member can be slid smoothly in the longitudinal direction by the rolling of balls and the rotating force can be transferred easily. In the invention described above, the chamfering tool or the rotary tool can be rotationally driven easily.

DETAILED DESCRIPTION OF THE INVENTION

Figure 1:
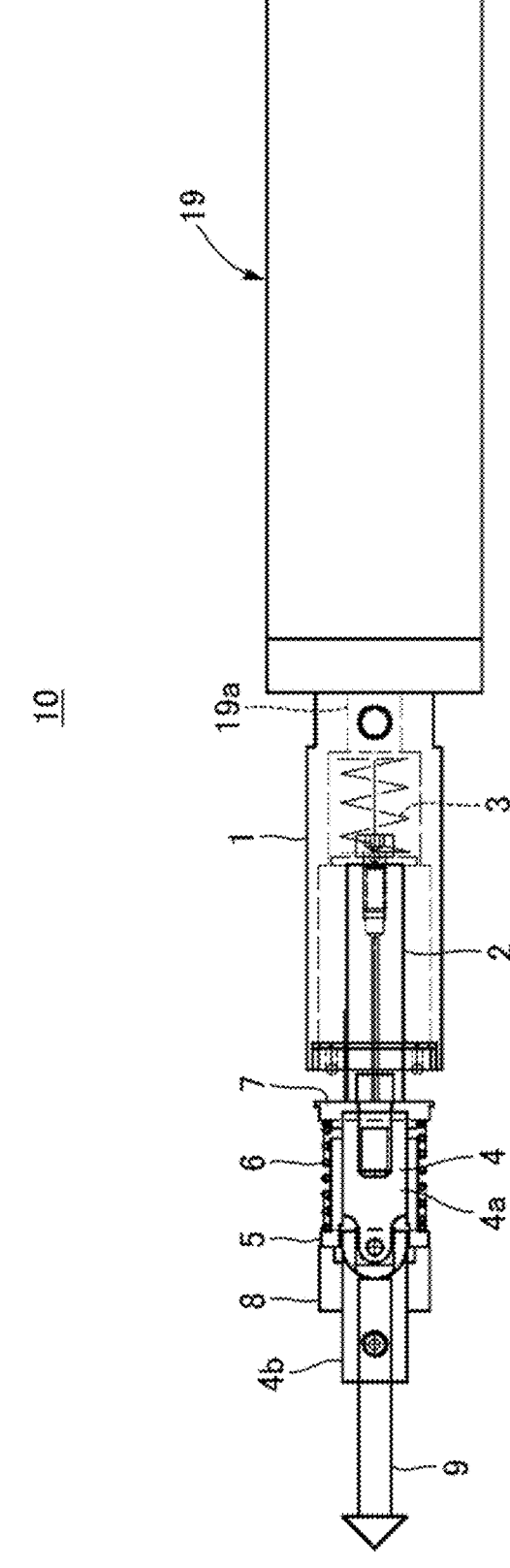
FIG. 1 is a cross-sectional view showing a chamfering tool of the present invention.
Figure 2:
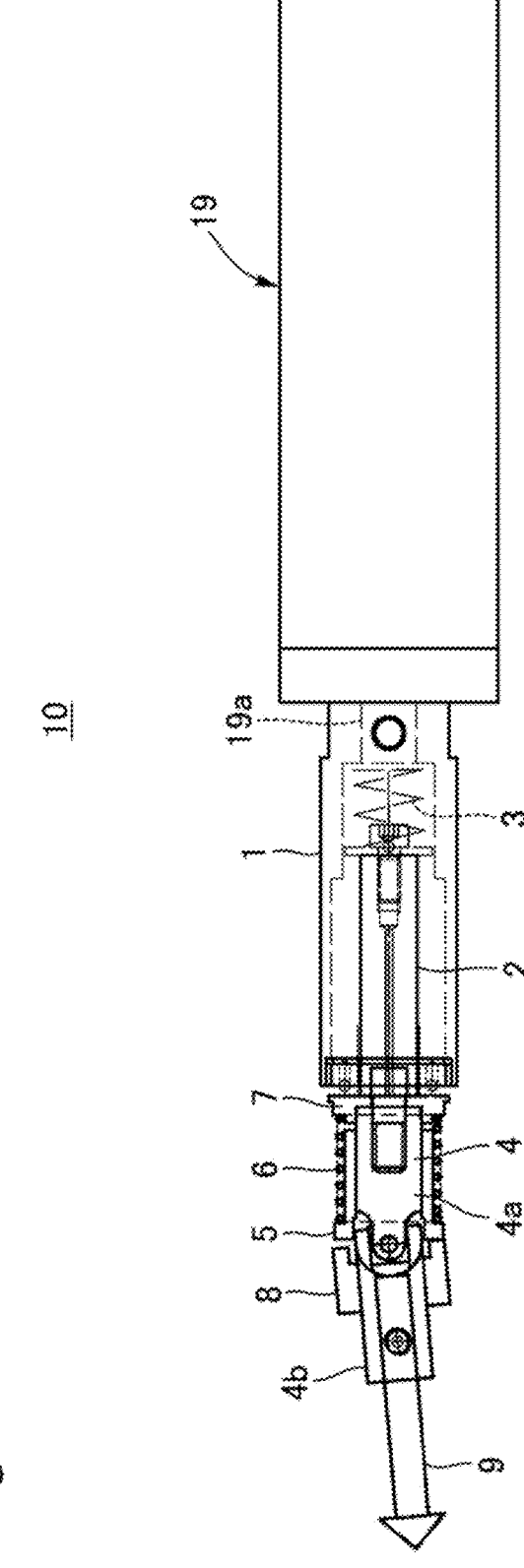
FIG. 2 is a cross-sectional view showing a chamfering tool of the present invention.
Figure 3A:
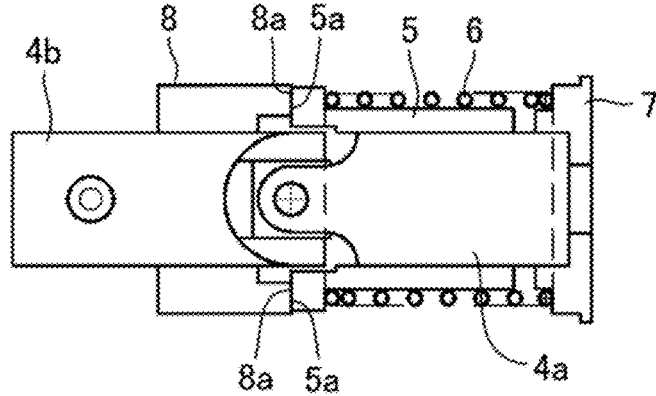
FIG. 3A is a cross-sectional view enlarging a part of FIG. 1.
Figure 3B:
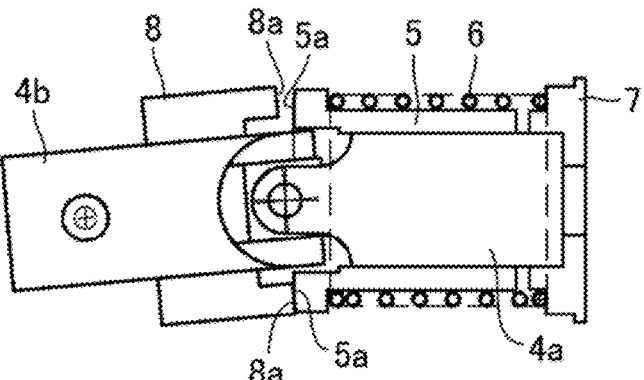
FIG. 3B is a cross-sectional view enlarging a part of FIG. 2.

Hereafter, an embodiment of the present invention will be explained with reference to the drawings. Note that the present invention is not limited to this embodiment. FIG. 1 is a cross-sectional view showing the chamfering tool of the present invention where an abutting surface of the fixed flange and an abutting surface of movable flange abut on each other. On the other hand, FIG. 2 is a cross-sectional view showing the chamfering tool of the present invention where the abutting surface of the fixed flange and the abutting surface of movable flange do not abut on each other. FIG. 3A is a cross-sectional view enlarging a part of FIG. 1. FIG. 3B is a cross-sectional view enlarging a part of FIG. 2. The details of the chamfering tool will be explained below using these drawings.

A chamfering tool 10 of the present invention includes: a sleeve 1 having a cylindrical shape and configured to receive a rotation power and rotate around a center axis; a shaft member 2 configured to rotate interlockingly with the sleeve 1 in a state that one end portion of the shaft member 2 is inserted in the sleeve 1 and the shaft member 2 is movable in an axial direction; a first spring member 3 inserted in the sleeve 1 so as to energize the one end portion of the shaft member 2; a joint member 4 composed of a universal joint in a state that one end portion 4a of the joint member 4 is connected with the other end portion of the shaft member 2 so that the joint member 4 rotates interlockingly with the shaft member 2; a movable flange 5 having a cylindrical shape so that the one end portion 4a of the joint member 4 is inserted in the movable flange 5; a second spring member 6 configured to energize the movable flange 5 by one end portion of the second spring member 6; a spring receiver 7 to which the other end portion of the second spring member 6 abuts; a fixed flange 8 fixed to the other end portion 4b of the joint member 4; and a chamfering member 9 fixed to the other end portion 4b of the joint member 4.

The fixed flange 8 and the movable flange 5 have abutting surfaces 8a, 5a formed by a flat surface respectively. When the abutting surface 8a and the abutting surface 5a abut on each other (surface contact), an axial center of the chamfering member 9 substantially coincides with an axial center of the shaft member 2 (shown in FIG. 3A). On the other hand, when the abutting surface 8a and the abutting surface 5a do not abut on each other as shown in FIG. 3B, the axial center of the chamfering member 9 does not coincide with the axial center of the shaft member 2. In FIG. 3B, although the abutting surface 8a and the abutting surface 5a seem to be in surface contact with each other at lower portions, the abutting surface 8a and the abutting surface 5a are partly in point contact or line contact with each other without being in surface contact with each other actually.

The fixed flange 8 is arranged so that a movable portion of the universal joint 4 does not interfere with the movable flange 5. Because of this, the movable flange 5 is prevented from interfering with the universal joint 4. Thus, the operation of the universal joint 4 is not restricted.

When the abutting surface 8a of the fixed flange 8 and the abutting surface 5a of the movable flange 5 abut on each other, a movable center point of the universal joint 4 is included in a surface including the abutting surfaces 8a, 5a. If the movable center point of the universal joint 4 is not included in the surface including the abutting surfaces, it is necessary to enlarge the clearance between the abutting surface 8a of the fixed flange 8 and the universal joint 4 or the clearance between the abutting surface 5a of the movable flange 5 and the universal joint 4. Thus, it is necessary to lengthen the length of the universal joint 4 and the entire size becomes necessarily large. Accordingly, the size of the chamfering tool 10 can be reduced by the above described configuration.

The other end portion of the shaft member 2 and the one end portion 4a of the joint member 4 are screwed to each other. Because of this, the shaft member 2 and the joint member 4 are internally connected with each other. Thus, the size of the chamfering tool 10 can be reduced.

The first spring member 3 and the second spring member 6 are composed of a compression coil spring, and a second force applied to the second spring member 6 is smaller than a first force applied to the first spring member 3. Because of this, the chamfering width can be uniformed more evenly.

The sleeve 1 is configured to rotate while being connected with a rotating shaft 19a of an air motor or an electric motor 19. Because of this, the chamfering tool 10 can be rotationally driven easily.

Figure 4:
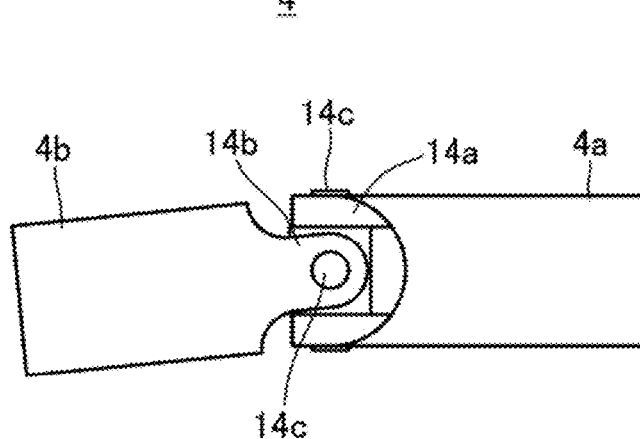
FIG. 4 is a perspective view showing a universal joint constituting the chamfering tool of the present invention.

FIG. 4 is a perspective view showing the universal joint constituting the chamfering tool of the present invention. As shown in FIG. 4, the one end portion 4a of the universal joint 4 is connected with the other end portion of the shaft member 2 and the chamfering member 9 is fixed to the other end portion 4b of the universal joint 4. A cross-shaped spider 14c is provided between a fork portion 14a of the one end portion and a fork portion 14b of the other end portion. The center point of the cross-shaped spider 14c is the above described movable center point of the universal joint 4.

Figure 5A:
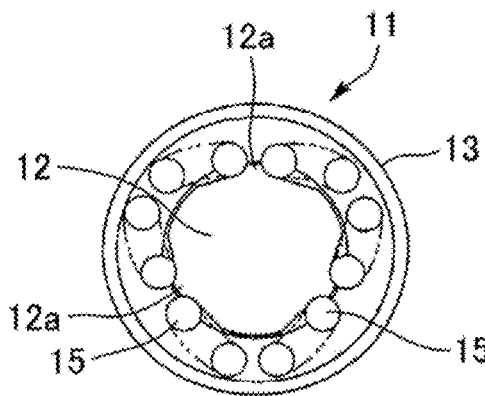
FIG. 5A is a longitudinal cross-sectional view showing an example of a ball spline bearing.
Figure 5B:
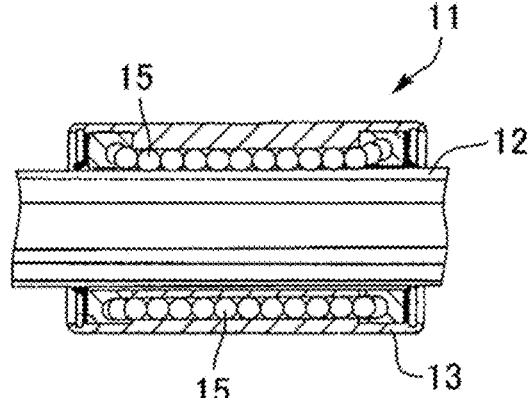
FIG. 5B is a transverse cross-sectional view showing an example of a ball spline bearing.

FIG. 5A is a longitudinal cross-sectional view showing an example of a ball spline bearing constituting the chamfering tool of the present invention. FIG. 5B is a transverse cross-sectional view of the same. In the shaft member 2 of the chamfering tool 10 of the present invention, a spline shaft 12 constituting a part of the shaft member 2 is axially supported by a ball spline bearing 11 built in the sleeve 1 so that the spline shaft 12 is movable in the axial direction. Here, the ball spline bearing 11 is composed of: a spline shaft 12 having protrusions 12a protruded in the axial direction at a plurality of portions in a circumferential direction in the cylindrical shape and track grooves at both sides of the protrusion 12a; an outer cylinder 13 having a hollow cylindrical shape to receive the spline shaft 12 so that the spline shaft 12 can be movably inserted in the outer cylinder 13, the outer cylinder 13 having track grooves corresponding to the track grooves of the spline shaft 12 at an inner periphery of the hollow cylindrical shape in a direction of pressing the protrusion 12a of the spline shaft; and a large number of balls 15, 15, --- inserted in the track grooves provided between the spline shaft 12 and the outer cylinder 13. Because of this, the shaft member 12 can be slid smoothly in the longitudinal direction by the rolling of balls 15 and the rotating force can be transferred easily.

When the above describe chamfering member 9 of the chamfering tool 10 of the present invention is changed to a workpiece machining tool including a tap for performing thread cutting and a deburring member for performing deburring, the rotary tool is not limited to the chamfering tool. Such rotary tools are also included in the present invention.

Figure 6:
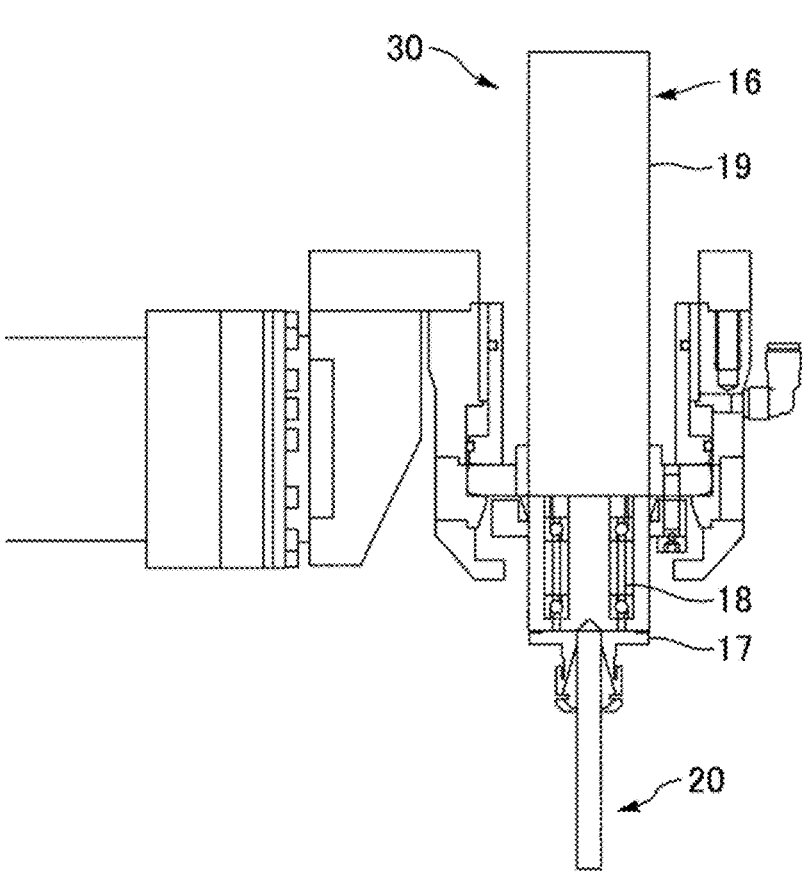
FIG. 6 is a cross-sectional view showing a state that the rotary tool of the present invention is attached to a machine having a robot arm or an NC controller.

FIG. 6 is a cross-sectional view showing a state that the rotary tool of the present invention is attached to a machine having a robot arm or an NC controller. As shown in FIG. 6, a machine 30 having a robot arm or an NC controller includes a tool drive unit 16. The tool drive unit 16 is composed of: a rotary tool 20; a chuck member 17 for holding the rotary tool 20; a bearing mechanism 18; and a motor 19. A rotary shaft of the motor and the chuck member 17 are connected with each other via the bearing mechanism 18. Note that the motor 19 can be driven by air or by electricity. Both types can be used. The rotary tool 20 means a tool capable of performing various machining such as deburring, polishing and cutting. The rotary tool 20 is detached from the chuck member and replaced with the tool in accordance with various machining. Note that the rotary tool 20 attached to the machine 30 having the robot arm or the NC controller does not require the first spring member that energizes the one end portion of the shaft member in the above described chamfering tool 10. The explanation of the other portions of the rotary tool 20 is omitted because the other portions are same as those of the chamfering tool.

INDUSTRIAL APPLICABILITY

The chamfering tool or the rotary tool of the present invention is used for chamfering the edge of the hole formed on the surface of the workpiece or used for machining a predetermined portion of the workpiece.

DESCRIPTION OF THE REFERENCE NUMERALS

1: sleeve
2: shaft member
3: first spring member
4: joint member (universal joint)

4*a*: one end portion of joint member
4*b*: the other end portion of joint member
5: movable flange
5*a*: abutting surface of movable flange
6: second spring member
7: spring receiver
8: fixed flange
8*a*: abutting surface of fixed flange
9: chamfering member
10, 20: chamfering tool (rotary tool)
11: ball spline bearing
12: spline shaft
12*a*: protrusion
13: outer cylinder
14*a*, 14*b*: fork portion
14*c*: cross-shaped spider
15: balls
16: tool drive unit
17: chuck member
18: bearing mechanism
19: motor
19*a*: rotating shaft of motor
30: machine having robot arm or NC controller

What is claimed is:

1. A chamfering tool, comprising:
a sleeve having a cylindrical shape, the sleeve being configured to receive a rotation power and rotate around a center axis;
a shaft member configured to rotate interlockingly with the sleeve, a first end portion of the shaft member being inserted in the sleeve, the shaft member being movable in an axial direction;
a first spring member inserted in the sleeve so as to apply a first force to the first end portion of the shaft member in an axial direction of the center axis;
a joint member composed of a universal joint, a first end portion of the joint member being connected with a second end portion of the shaft member so that the joint member rotates interlockingly with the shaft member;
a movable flange having a cylindrical shape, the first end portion of the joint member being inserted in the movable flange;

a second spring member, a first end portion of the second spring member being configured to apply a second force to the movable flange in the axial direction of the center axis;
a spring receiver, a second end portion of the second spring member being configured to abut on the spring receiver;
a fixed flange fixed to the second end portion of the joint member; and
a chamfering member fixed to the second end portion of the joint member, wherein
the fixed flange has a first abutting surface formed by a flat surface and the movable flange has a second abutting surface formed by a flat surface, and
when the first abutting surface and the second abutting surface abut on each other, an axial center of the chamfering member substantially coincides with an axial center of the shaft member.

2. The chamfering tool according to claim 1, wherein
the fixed flange is arranged so that a movable portion of the universal joint does not interfere with the movable flange.

3. The chamfering tool according to claim 1, wherein
when the first abutting surface and the second abutting surface abut on each other, a movable center point of the universal joint is included in a surface including the first abutting surface and the second abutting surface.

4. The chamfering tool according to claim 1, wherein
the second end portion of the shaft member and the first end portion of the joint member are screwed to each other.

5. The chamfering tool according to claim 1, wherein
the first spring member and the second spring member are composed of a compression coil spring, and
the second force applied to the second spring member is smaller than the first force applied to the first spring member.

6. The chamfering tool according to claim 1, wherein
the shaft member is axially supported by a ball spline bearing so that the shaft member is movable in the axial direction with respect to the sleeve.

7. The chamfering tool according to claim 1, wherein
the sleeve is configured to rotate while being connected with a rotating shaft of an air motor or an electric motor.

* * * * *